(12) United States Patent
Kim et al.

(10) Patent No.: US 10,615,386 B2
(45) Date of Patent: Apr. 7, 2020

(54) TRAY FOR STORING BATTERY CELLS INCLUDING A PRESSING DEVICE

(71) Applicant: LG Chem, Ltd., Seoul (KR)

(72) Inventors: Gi Man Kim, Daejeon (KR); Ho Il Lee, Daejeon (KR); Hyoung Sik Choi, Daejeon (KR)

(73) Assignee: LG CHEM, LTD., Seoul (KR)

( * ) Notice: Subject to any disclaimer, the term of this patent is extended or adjusted under 35 U.S.C. 154(b) by 99 days.

(21) Appl. No.: 15/952,601

(22) Filed: Apr. 13, 2018

(65) Prior Publication Data
US 2018/0301676 A1 Oct. 18, 2018

(30) Foreign Application Priority Data
Apr. 18, 2017 (KR) .......................... 10-2017-0049541

(51) Int. Cl.
*H01M 2/10* (2006.01)
*H01M 2/02* (2006.01)
*H01M 10/04* (2006.01)

(52) U.S. Cl.
CPC ......... *H01M 2/1077* (2013.01); *H01M 2/024* (2013.01); *H01M 2/0207* (2013.01); *H01M 2/1005* (2013.01); *H01M 2/1061* (2013.01); *H01M 10/0481* (2013.01); *H01M 2220/20* (2013.01)

(58) Field of Classification Search
CPC ......................... H01M 2/1077; H01M 10/0525
See application file for complete search history.

(56) References Cited

U.S. PATENT DOCUMENTS

2015/0214570 A1* 7/2015 Deponte ........... H01M 10/0481
429/99

FOREIGN PATENT DOCUMENTS

| JP | 2013-206689 A | 10/2013 |
|---|---|---|
| KR | 10-2000-0040472 A | 7/2000 |
| KR | 10-0782886 B1 | 12/2007 |
| KR | 10-2012-0137685 A | 12/2012 |
| KR | 10-2012-0138660 A | 12/2012 |
| KR | 10-2015-0049972 A | 5/2015 |

* cited by examiner

Primary Examiner — Olatunji A Godo
(74) Attorney, Agent, or Firm — Birch, Stewart, Kolasch & Birch, LLP

(57) ABSTRACT

The present disclosure provides a tray for storing battery cells, in which a plurality of storage plates having at least one battery cell stored therein are loaded by being stacked in one direction, the tray including a pressing device configured to press one end portion or both end portions of the storage plates with respect to a direction in which the storage plates are stacked in the tray so that the battery cells are stored in the storage plate without clearance from the storage plate.

12 Claims, 7 Drawing Sheets

TRAY FOR STORING BATTERY CELLS INCLUDING A PRESSING DEVICE

CROSS-REFERENCE TO RELATED APPLICATION

This application claims priority to Korean Patent Application No. 10-2017-0049541 filed on Apr. 18, 2017, the contents of which are incorporated by reference in their entirety.

TECHNICAL FIELD

The present disclosure relates to a tray for storing battery cells including a pressing device.

RELATED ART

The demand for use of alternative energy, or clean energy, is increasing as a reaction to a rapid increase in the use of fossil fuels. As a part of this trend, one of the most active research fields is electrochemical-based power generation and storage.

At present, a typical example of an electrochemical device that utilizes electrochemical energy is a secondary battery, and its applications are gradually increasing.

Recently, in line with growing concerns about environmental issues, research into electric vehicles (EVs), hybrid EVs (HEVs), and the like which are able to replace vehicles using fossil fuels such as gasoline vehicles and diesel vehicles, which are one of major sources of air pollution, has been actively conducted, and secondary batteries are mainly used as a power source for EVs, HEVs, and the like.

Typically, in terms of a shape of a battery, there is a high demand for a prismatic type secondary battery and a pouch-shaped secondary battery that can be applied to products having a thin profile and requiring high energy density in tight spaces. In terms of materials of the battery, there is a high demand for lithium secondary batteries such as lithium ion batteries and lithium ion polymer batteries having advantages such as high energy density, discharge voltage, output stability, and the like.

Secondary batteries may be classified based on a structure of an electrode assembly including a positive electrode, a negative electrode, and a separator. For example, the electrode assembly may have a jelly-roll (wound) type structure in which long-sheet type positive electrodes and negative electrodes are wound while separators are disposed between the positive electrodes and the negative electrodes, a stacked type structure in which pluralities of positive electrodes and negative electrodes each of which having a predetermined size are sequentially stacked while separators are disposed between the positive electrodes and the negative electrodes, and a stacked/folded type structure in which pluralities of positive electrodes and negative electrodes each of which having a predetermined size are sequentially stacked while separators are disposed between the positive electrodes and the negative electrodes to constitute a unit cell such as a bi-cell or a full cell, and then unit cells are wound while being disposed on a separation film or another stacked/folded type electrode assembly in which bi-cells or full cells are stacked with separators disposed between the bi-cells or the full cells.

Recently, the pouch-shaped battery in which a stacked type or a stacked/folded electrode assembly is embedded in a pouch-shaped battery case of an aluminum laminate sheet is attracting much attention due to its low manufacturing cost, low weight, easy shape customization and the like, and its usage is gradually increasing.

FIG. 1 is a schematic perspective view of a typical conventional pouch-shaped battery cell 10. The pouch-shaped battery cell 10 of FIG. 1 has a structure in which each of two electrode leads 11 and 12 faces each other and protrudes from an upper end portion and a lower end portion of an external covering member 14 and is opposed to each other. The battery cell 10 is manufactured by bonding one side portion 14a, an upper end portion 14b and a lower end portion 14c, which are mutual contact portions, in a state in which an electrode assembly (not shown) is mounted on a storage 13 formed on an inner surface of the external covering member 14. The external covering member 14 is made of a laminate structure of a resin layer/a metal foil layer/a resin layer. Thus, the one side portion 14a, the upper end portion 14b, and the lower end portion 14c, which are in contact with each other, may be bonded by applying heat and pressure thereto so that the resin layers may fuse to each other, and in some cases, may be adhered using an adhesive.

Such a pouch-shaped battery cell has a high energy density and may be formed in various shapes, and has recently been used as automobile power sources because it enables various designs of automobiles. The pouch-shaped battery cell applied to such an automobile battery has a relatively large size and mass.

FIG. 2 is a schematic plan view showing a conventional storage plate 20 configured to store battery cells.

Referring to FIG. 2, the conventional storage plate 20 is used for storing and packaging of the battery cells. The storage plate 20 includes an accommodation portion 25 having a downwardly recessed shape corresponding to a planar shape of a battery cell (not shown) for storing the battery cell.

FIG. 3 is a schematic perspective view showing a conventional tray 30 in which a plurality of storage plates 20 having the battery cells stored therein are loaded.

However, when the battery cells are stored in the conventional storage plate and the storage plates having the battery cells stored therein are loaded on the conventional tray, clearance may be generated between the battery cell and the storage plate. Accordingly, when the tray on which the storage plates are loaded is transferred, friction or impact is generated at surface-contacted portions due to vibrations during transfer, and thus a large amount of scratches are generated on surfaces of the battery cells, resulting in cosmetic defects of products.

Therefore, there is a high need to develop a technique for solving the above problems.

SUMMARY

The present disclosure is provided to solve the above-described problems of the related art and technical problems which have been identified in the past.

In particular, because a tray for storing battery cells of the present disclosure includes a pressing device configured to press one end portion or both end portions of storage plates with respect to a direction in which the storage plates are stacked in the tray, battery cells stored in the storage plate may be fixed without clearance from the storage plate. Accordingly, friction or impact may be prevented from occurring on surface-contacted portions due to vibrations generated when the tray on which storage plates are stacked is transferred.

According to one aspect of the present disclosure, there is provided a tray for storing battery cells, in which a plurality of storage plates having at least one battery cell stored therein are loaded by being stacked in one direction, the tray including a pressing device configured to press one end portion or both end portions of the storage plates with respect to a direction in which the storage plates are stacked in the tray so that the battery cells are stored in the storage plate without clearance from the storage plate.

Accordingly, the tray for storing battery cells according to the present disclosure may effectively prevent friction or impact from occurring on surface-contacted portions due to vibrations generated when the tray on which the storage plates are stacked is transferred, by including the pressing device configured to press one or both ends of the storage plates with respect to a direction in which the storage plates are stacked in the tray so that the battery cells stored in the storage plate are fixed without clearance from the storage plate.

In one specific example, the battery cell may have a structure in which an electrode assembly having a positive electrode, a negative electrode, and a separator interposed between the positive electrode and the negative electrode is inserted and sealed in a plate type battery case. Further, the battery cell may have a rectangular plate type structure. Specifically, the plate type battery cell may have a rectangular shape having a pair of long sides and a pair of short sides on a plane, and a positive electrode terminal and a negative electrode terminal having a plate shape may be formed on one side or both sides of the battery cell.

In one specific example, the tray may include a first sidewall, a second sidewall, a third sidewall, and a fourth sidewall protruding from an outer periphery of a bottom plate.

Further, the storage plates may be stacked in such a manner in which each of the storage plates is inserted between the first sidewall and the third sidewall.

Further, the storage plates may be stacked and arranged so that arrangement directions thereof are the same with each other.

Specifically, the storage plate may include an accommodation portion having a downward recess corresponding to a planar shape of the battery cell. More specifically, two to four accommodation portions may be formed on the storage plate.

In one specific example, the pressing device may include a pressing portion having at least one pressing plate for pressing one end portion of the storage plates, and a pressure controller configured to control a pressing force applied to the one end portion of the storage plates by the pressing plate.

In one specific example, a distance between one side surface of the pressing plate facing the storage plates and an inner surface of the first sidewall of the tray facing the storage plates may be set to be equal to an overall thickness of the storage plates in a stacking direction.

Further, the pressing plate facing the storage plates may be locked at the distance set to be equal to the overall thickness of the storage plates in the stacking direction, or may be locked at a distance smaller than the above-described distance. In such a structure, the storage plates in which the battery cells are stored may be tightly compressed against each other and loaded on the tray, and thus clearance between the battery cell and the storage plate may be effectively removed.

Specifically, the pressing portion may include a first pressing plate configured to press against one end portion or the other end portion of the storage plates, a second pressing plate configured to transmit a pressing force to the first pressing plate, and at least one support shaft configured to guide moving directions of the first pressing plate and the second pressing plate.

Further, the pressure controller may include an adjusting screw bolt configured to control a pressing force applied to the one end portion or the other end portion of the storage plates by changing a distance between the first pressing plate and the second pressing plate, and a support plate in which a part of the adjusting screw bolt is inserted and retained so that the adjusting screw bolt may rotate clockwise or counterclockwise with respect to an axis of the adjusting screw bolt.

In one specific example, the pressing portion may further include an elastic member for allowing the second pressing plate to transmit a pressing force to the first pressing plate. Specifically, the elastic member may be a spring member, and the spring member may be disposed between the first pressing plate and the second pressing plate. The spring member may have one end coupled to one surface of the second pressing plate, and the other end coupled to the other surface of the first pressing plate.

In one specific example, the battery cell may be a lithium secondary battery with high energy density, high discharge voltage and high output stability.

Other components of the lithium secondary battery according to the present disclosure will be described in detail below.

The lithium secondary battery is generally composed of a positive electrode, a negative electrode, a separator, a non-aqueous electrolyte solution containing a lithium salt, and the like.

The positive electrode may be prepared, for example, by applying a mixture of a positive electrode active material, a conductive material, and a binder on a positive electrode current collector and then drying the resultant, and a filler may be further added to the mixture as necessary.

The positive electrode active material may be a material capable of causing an electrochemical reaction, and may be a lithium transition metal oxide and may include two or more transition metals. Examples of the positive electrode active material may include layered compounds such as lithium cobalt oxide ($LiCoO_2$) substituted with one or more transition metals, lithium nickel oxide ($LiNiO_2$); lithium manganese oxides substituted with one or more transition metals; lithium nickel-based oxides having formula $LiNi_{1-y}M_yO_2$ (wherein, M includes one or more elements selected from the group consisting of Co, Mn, Al, Cu, Fe, Mg, B, Cr, Zn or Ga, and $0.01 \leq y \leq 0.7$); lithium nickel cobalt manganese composite oxides having formula $Li_{1+z}Ni_bMn_cCo_{1-(b+c+d)}M_dO_{(2-e)}A_e$ such as $Li_{1+z}Ni_{1/3}Co_{1/3}Mn_{1/3}O_2$ and $Li_{1+z}Ni_{0.4}Mn_{0.4}Co_{0.2}O_2$ (wherein, $-0.5 \leq z \leq 0.5$, $0.1 \leq b \leq 0.8$, $0.1 \leq c \leq 0.8$, $0 \leq d \leq 0.2$, $0 \leq e \leq 0.2$, $b+c+d \leq 1$, M=Al, Mg, Cr, Ti, Si or Y and A=F, P or Cl); Olivine-based lithium metal phosphates having formula $Li_{1+x}M_{1-y}M'_yPO_{4-z}X_z$ (wherein, M is a transition metal, preferably M=Fe, Mn, Co or Ni, M'=Al, Mg or Ti, X=F, S or N, $-0.5 \leq x \leq +0.5$, $0 \leq y \leq 0.5$ and $0 \leq z \leq 0.1$); and the like, but embodiments of the present disclosure are not limited thereto.

The conductive agent may be generally added so that the conductive agent has 1 to 20 wt % based on the total weight of the compound including the positive electrode active material. The conductive agent is not particularly restricted so long as the conductive agent exhibits high conductivity while the conductive agent does not induce any chemical change in a battery to which the conductive agent is applied. For example, graphite, such as natural graphite or artificial graphite; carbon black, such as carbon black, acetylene black, Ketjen black, channel black, furnace black, lamp black, thermal black; conductive fiber, such as carbon fiber or metallic fiber; metallic powder, such as carbon fluoride powder, aluminum powder, or nickel powder; conductive whisker, such as zinc oxide or potassium titanate; conductive metal oxide, such as titanium oxide; or polyphenylene derivatives may be used as the conductive agent.

The filler is an optional component used to inhibit expansion of the positive electrode. There is no particular limit to the filler so long as the filler does not cause chemical changes in a battery to which the filler is applied, and is made of a fibrous material. For example, olefin polymers, such as polyethylene and polypropylene; and fibrous materials, such as glass fiber and carbon fiber may be used.

In addition, the negative electrode may be manufactured by coating and drying a mixture of a negative electrode active material, a conductive material and a binder on a negative electrode current collector. As desired, a filler may be further added to the mixture. Also, the negative electrode active material may be one or more selected from the group consisting of graphite carbon, coke-based carbon and hard carbon.

Since the configurations of the lithium secondary battery are well known in the art, the detailed description thereof will be omitted herein.

As described above, since the tray for storing battery cells according to the present disclosure includes a pressing device configured to press one end portion or both end portions of the storage plates with respect to a direction in which the storage plates are stacked in the tray so that the battery cells stored in the storage plate are retained without clearance from the storage plate, friction or impact may be effectively prevented from occurring on surface-contacted portions due to vibrations generated when the tray on which storage plates are stacked is transferred.

BRIEF DESCRIPTION OF THE DRAWINGS

The above and other objects, features and advantages of the present disclosure will become more apparent to those of ordinary skill in the art by describing in detail exemplary embodiments thereof with reference to the accompanying drawings, in which.

DETAILED DESCRIPTION

Figure 1:
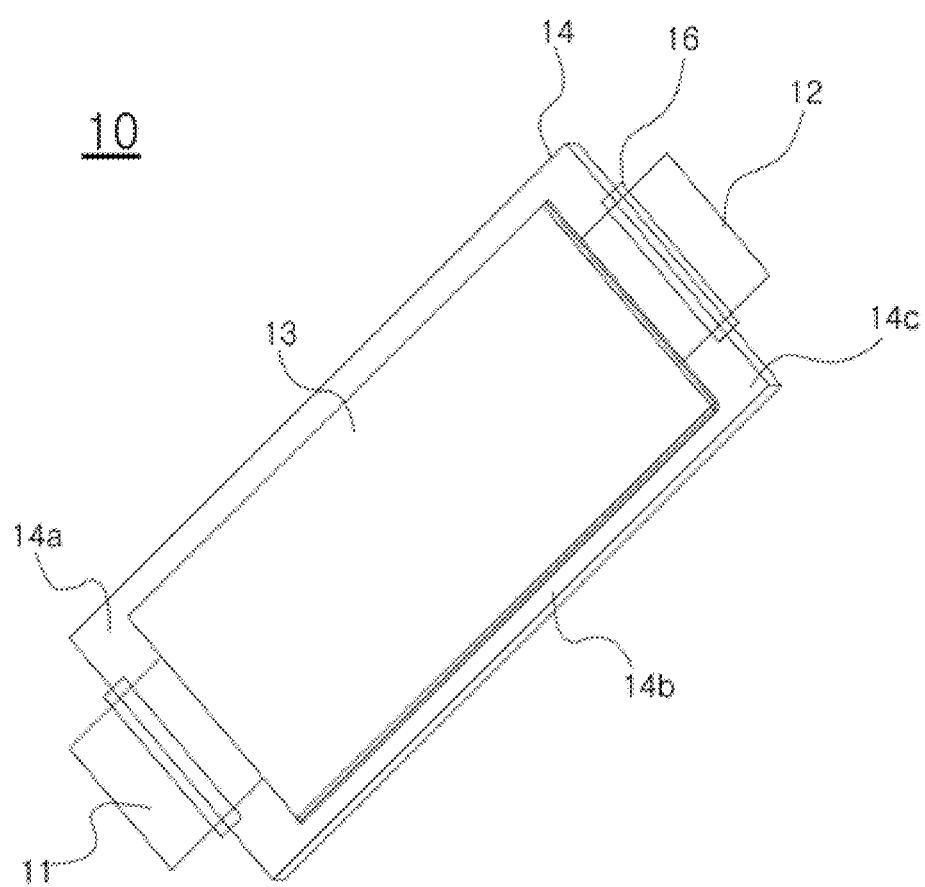
FIG. 1 is a schematic perspective view showing a typical conventional pouch-shaped battery cell.
Figure 2:
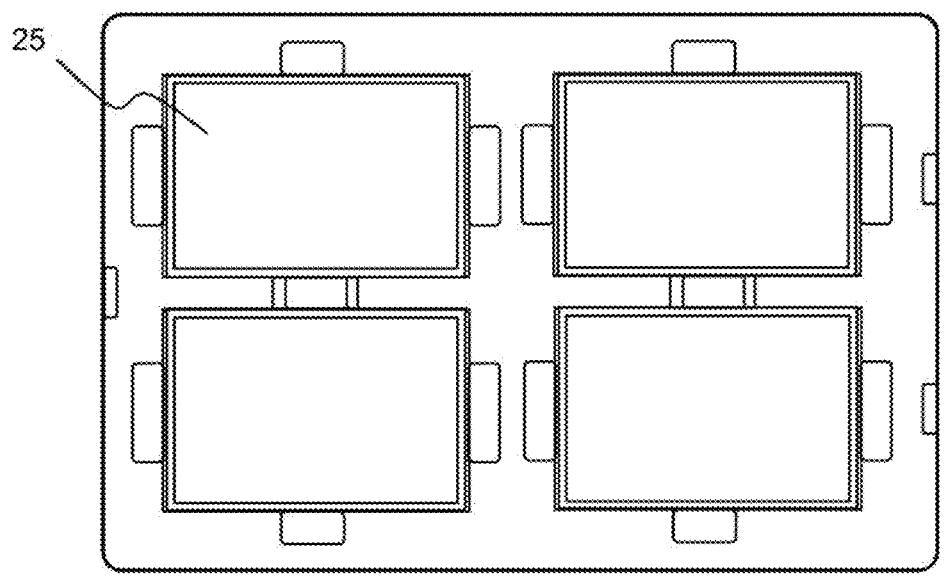
FIG. 2 is a schematic plan view showing a conventional storage plate configured to store battery cells.
Figure 3:
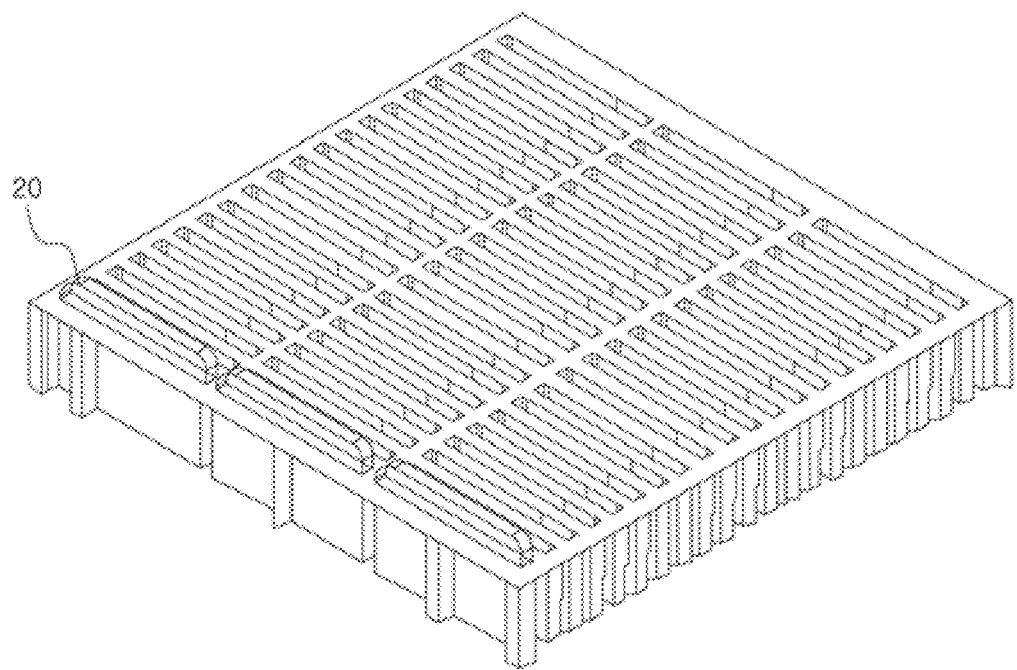
FIG. 3 is a schematic perspective view showing a conventional tray in which a plurality of storage plates having battery cells stored therein are loaded.

Advantages and features of the present disclosure and methods of achieving the same will become apparent with reference to the exemplary embodiments described in detail below in conjunction with the accompanying drawings. However, the present disclosure is not limited to the exemplary embodiments disclosed below, but may be provided in various different forms. The present exemplary embodiments are merely provided to make the disclosure complete and to fully inform the category of the disclosure to a person having ordinary knowledge in the technical field to which the present disclosure pertains, and the present disclosure is only defined by the scope of the claims.

Accordingly, in some embodiments, well-known process steps, well-known structures and well-known techniques will not be specifically described in order to avoid ambiguous interpretation of the present disclosure. The terms used in the present specification are for the purpose of illustrating the examples and do not limit the present disclosure. As used herein, the singular form also includes the plural forms unless specifically stated in a phrase. The terns "comprises" and/or "comprising" used in the specification are used in the meaning of not excluding the presence or addition of one or more other constituent elements, steps, operations and/or elements, in addition to the referenced constituent elements, step, operation and/or element. Further, the term "and/or" includes each and one or more combinations of the referenced items.

The exemplary embodiments described herein will be also described with reference to cross-sectional and/or schematic views, which are ideal exemplary views of the present disclosure. Therefore, the forms of the exemplary views may be modified by manufacturing technique and/or tolerance and the like. Therefore, the exemplary embodiments of the present disclosure also include a change in the form generated according to the manufacturing process, without being limited to the illustrated specific form. Further, in each drawing illustrated in the present disclosure, the respective constituent elements may be illustrated by being slightly enlarged or reduced for the convenience of explanation. The same reference numerals refer to the same elements throughout the specification.

Hereinafter, the present disclosure will be described in detail with reference to the drawings, but the scope of the present disclosure is not limited thereto.

Figure 4:
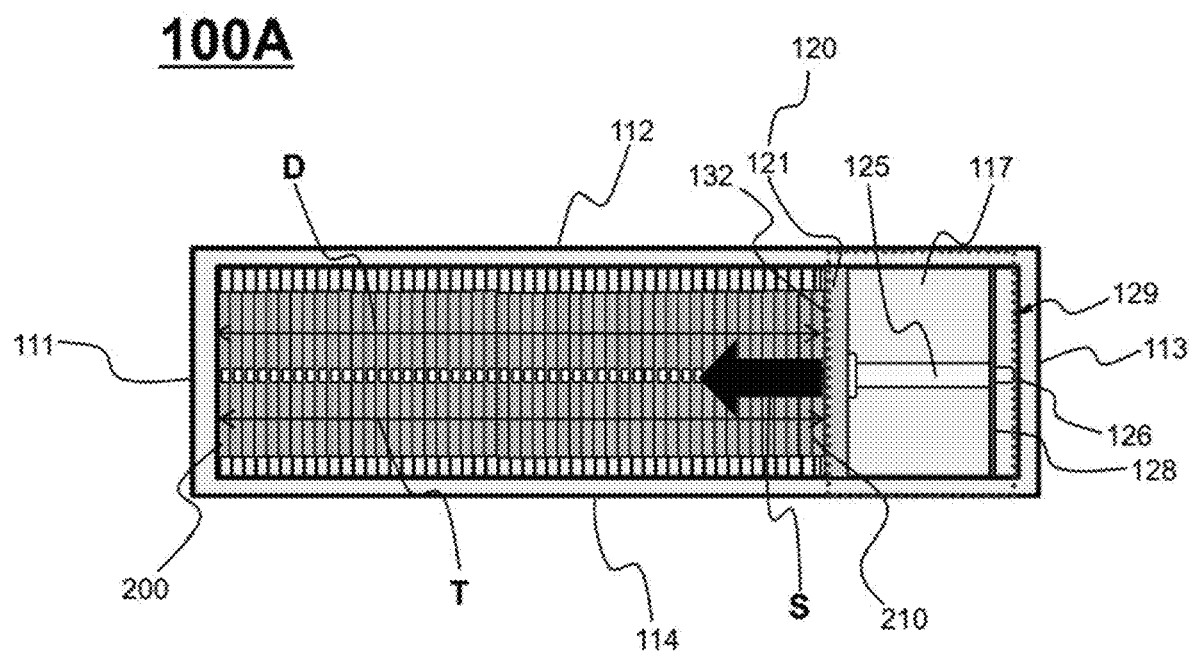
FIG. 4 is a schematic plan view showing a tray for storing battery cells according to one exemplary embodiment of the present disclosure in which storage plates having battery cells stored therein are loaded.

FIG. 4 is a schematic plan view showing a tray 100A for storing battery cells according to one exemplary embodiment of the present disclosure in which storage plates 200 having battery cells stored therein are loaded.

Referring to FIG. 4, the tray 100A for storing battery cells according to the present disclosure is the tray 100A in which the plurality of storage plates 200 having battery cells (not shown) stored therein are loaded by being stacked in one direction S.

Further, the tray 100A for storing battery cells according to the present disclosure may include a pressing device 129 configured to press one end portion 210 of the storage plates 200 with respect to a direction in which the storage plates 200 are stacked in the tray 100A so that the battery cells stored in the storage plates 200 may be fixed (e.g., retained, compressed) without clearance from the storage plate 200.

Further, the tray 100A may include a first sidewall 111, a second sidewall 112, a third sidewall 113, and a fourth sidewall 114 formed by extending (e.g., protruding) along an outer periphery of a bottom plate 117.

Further, the storage plates 200 may be stacked in such a manner in which each of the storage plates 200 is inserted between the first sidewall 111 and the third sidewall 113.

Further, the storage plates 200 may be stacked and arranged so that arrangement directions thereof are the same with each other.

Here, the pressing device 129 may include a pressing portion 120 having a first pressing plate 121 configured to press one end portion 210 of the storage plates 200, and a pressure controller 125 configured to control a pressing force applied to the one end portion 210 of the storage plates 200 by the first pressing plate 121.

A distance D between one side surface 132 of the first pressing plate 121 facing the storage plates 200 and an inner surface of the first sidewall 111 of the tray 100A facing the storage plates 200 may be set to be equal to an overall thickness T of the storage plates 200 in a stacking direction.

Further, the first pressing plate 121 facing the storage plates 200 may be fixed (e.g., locked) at the distance D set to be equal to the overall thickness T of the storage plates 200 in the stacking direction to press one side of the storage plates 200.

Figure 5:
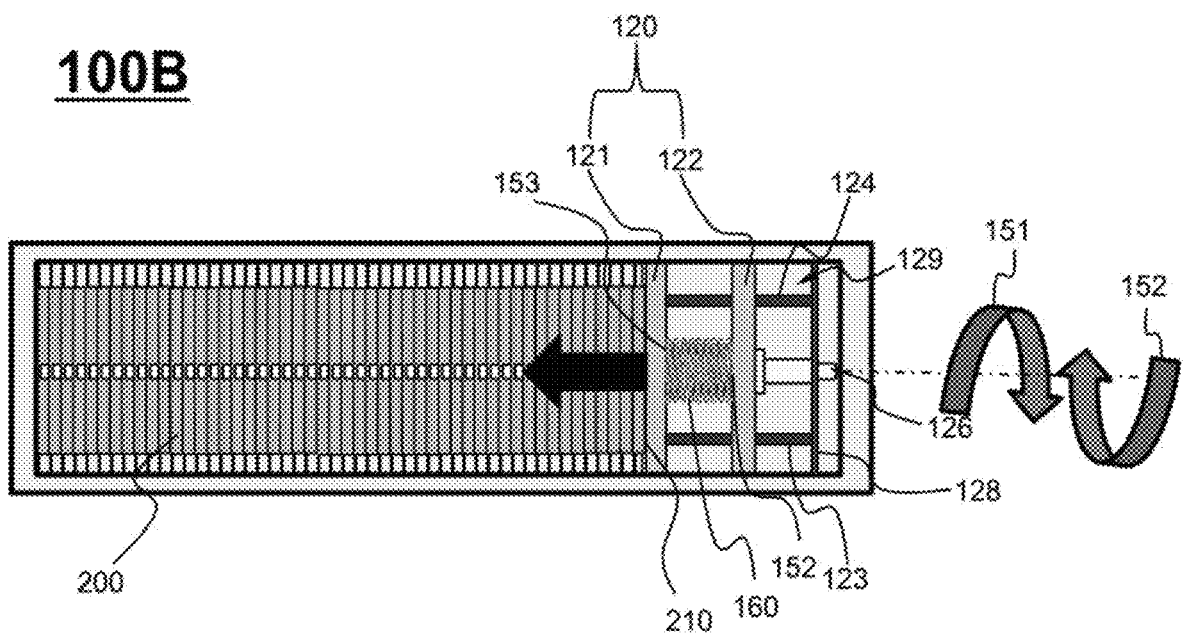
FIG. 5 is a schematic plan view showing a tray for storing battery cells according to another exemplary embodiment of the present disclosure in which storage plates having battery cells stored therein are loaded.
Figure 6:
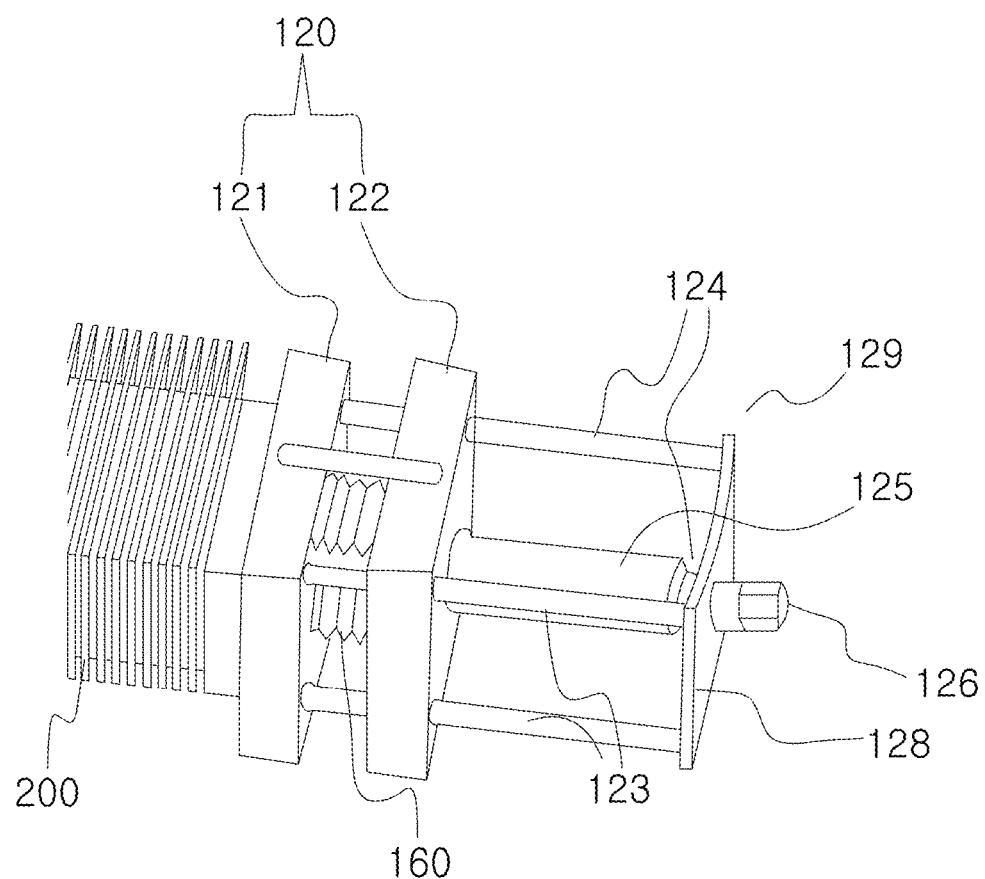
FIG. 6 is a partial perspective view showing a part of the tray for storing battery cells of FIG. 5 in which the storage plates having the battery cells stored therein are loaded.

FIG. 5 is a schematic plan view showing a tray 100B for storing battery cells according to another exemplary embodiment of the present disclosure in which storage plates 200 having battery cells stored therein are loaded, and FIG. 6 is a partial perspective view showing a part of the tray 100B for storing battery cells of FIG. 5 in which the storage plates 200 having the battery cells stored therein are loaded.

Referring to FIGS. 5 and 6, in the tray 100B for storing battery cells according to the present disclosure, a pressing portion 120 may include a first pressing plate 121 configured to press against one end portion of the storage plates 200, a second pressing plate 122 configured to transmit a pressing force to the first pressing plate 121, and support shafts 123 and 124 configured to guide moving directions (e.g., paths) of the first pressing plate 121 and the second pressing plate 122.

Further, a pressure controller 125 may include: an adjusting screw bolt 126 configured to control a pressing force applied to one end portion 210 of the storage plates 200 by changing a distance between the first pressing plate 121 and the second pressing plate 122; and a support plate 128 in which a part of the adjusting screw bolt 126 is inserted and fixed (e.g., retained) so that the adjusting screw bolt 126 may rotate clockwise 151 or counterclockwise 152 with respect to an axis of the adjusting screw bolt 126.

The pressing portion 120 may further include a spring member 160 (e.g., elastic member) for allowing the second pressing plate 122 to transmit a pressing force to the first pressing plate 121. The spring member 160 may be disposed between the first pressing plate 121 and the second pressing plate 122, and have one end coupled to one surface 152 of the second pressing plate 122 and the other end coupled to one surface 153 of the first pressing plate 121.

Figure 7:
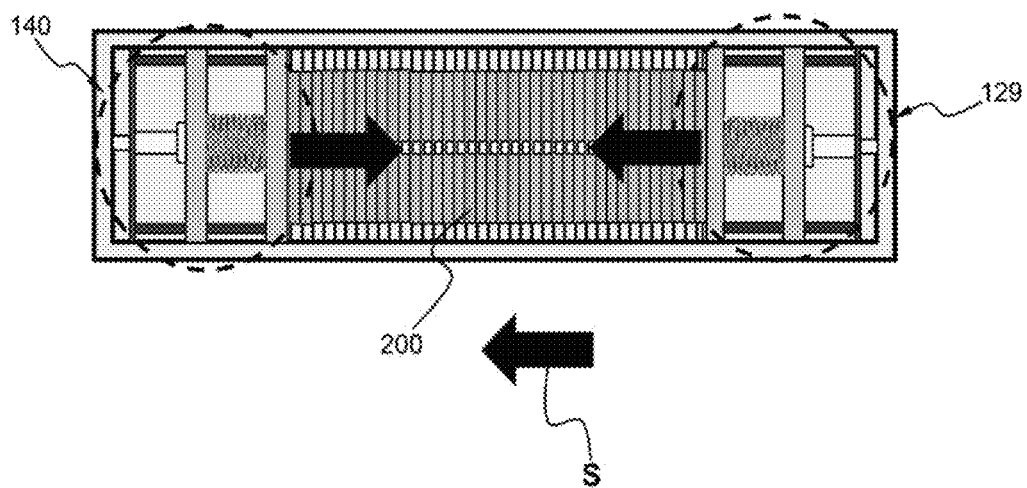
FIG. 7 is a schematic plan view showing a tray for storing battery cells according to still another exemplary embodiment of the present disclosure in which storage plates having battery cells stored therein are loaded.

FIG. 7 is a schematic perspective view showing a tray 100C for storing battery cells according to still another exemplary embodiment of the present disclosure in which storage plates 200 having battery cells stored therein are loaded.

Referring to FIG. 7, the tray 100C for storing battery cells according to still another exemplary embodiment of the present disclosure may include pressing devices 129 and 140 configured to press both end portions of the storage plates 200 with respect to a direction S in which the storage plates 200 are stacked.

Here, the pressing devices 129 and 140 of FIG. 6 may have the same configurations as the pressing device 129 of FIG. 5. Remaining components may also be the same as those described above in the tray 100B for storing battery of FIG. 5.

As described above, a tray for storing battery cells according to the present disclosure can effectively prevent friction or impact from occurring on surface-contacted portions due to vibrations generated when the tray on which storage plates are stacked is transferred, by including a pressing device configured to press one or both ends of the storage plates with respect to a direction in which the storage plates are stacked in the tray so that the battery cells stored in the storage plate are fixed without clearance from the storage plate.

It should be understood by those skilled in the art that various changes may be made without departing from the spirit and scope of the present disclosure.

The invention claimed is:

1. A tray for storing battery cells, in which a plurality of storage plates having at least one battery cell stored therein are loaded by being stacked in one direction, the tray comprising:
    a pressing device configured to press one end portion or both end portions of the storage plates with respect to a direction in which the storage plates are stacked in the tray so that the battery cells are stored between the storage plates without clearance from the storage plates,
    wherein the pressing device includes an adjusting screw bolt configured to control a pressing force applied to the storage plates, and
    wherein the pressing force is adjusted by rotating the adjusting screw bolt.

2. The tray of claim 1, wherein the battery cells have a structure in which an electrode assembly having a positive electrode, a negative electrode, and a separator interposed between the positive electrode and the negative electrode is inserted and sealed in a plate type battery case.

3. The tray of claim 1, wherein the tray includes a first sidewall, a second sidewall, a third sidewall, and a fourth sidewall protruding from an outer periphery of a bottom plate.

4. The tray of claim 3, wherein the storage plates are stacked in such a manner in which each of the storage plates is inserted between the first sidewall and the third sidewall.

5. The tray of claim 1, wherein the tray has a structure in which storage plates are stacked and arranged so that arrangement directions thereof are the same with each other.

6. The tray of claim 1, wherein the storage plates include an accommodation portion having a downward recess corresponding to a planar shape of the battery cell.

7. The tray of claim 4, wherein the pressing device comprises:
    a pressing portion having at least one pressing plate for pressing one end portion of the storage plates; and
    a pressure controller configured to control the pressing force applied to the one end portion of the storage plates by the pressing plate.

8. The tray of claim 7, wherein the tray has a structure in which a distance between one side surface of the pressing plate facing the storage plates and an inner surface of the first sidewall of the tray facing the storage plates are configured to be set equal to an overall thickness of the storage plates in a stacking direction.

9. The tray of claim 8, wherein the tray has a structure in which the at least one pressing plate facing the storage plates is configured to be locked at the distance set to be equal to the overall thickness of the storage plates in the stacking direction.

10. The tray of claim 7, wherein the pressing portion further comprises:
   a first pressing plate configured to press against one end portion or the other end portion of the storage plates;
   a second pressing plate configured to transmit the pressing force to the first pressing plate; and
   at least one support shaft configured to guide moving directions of the first pressing plate and the second pressing plate.

11. The tray of claim 10, wherein the adjusting screw bolt is configured to control the pressing force applied to the one end portion or the other end portion of the storage plates by changing a distance between the first pressing plate and the second pressing plate; and
   wherein the pressure controller further comprises a support plate in which a part of the adjusting screw bolt is inserted and retained so that the adjusting screw bolt is configured to be rotated clockwise or counterclockwise with respect to an axis of the adjusting screw bolt.

12. The tray of claim 10, wherein the pressing portion further includes an elastic member for allowing the second pressing plate to transmit the pressing force to the first pressing plate.

* * * * *